Figure 1:
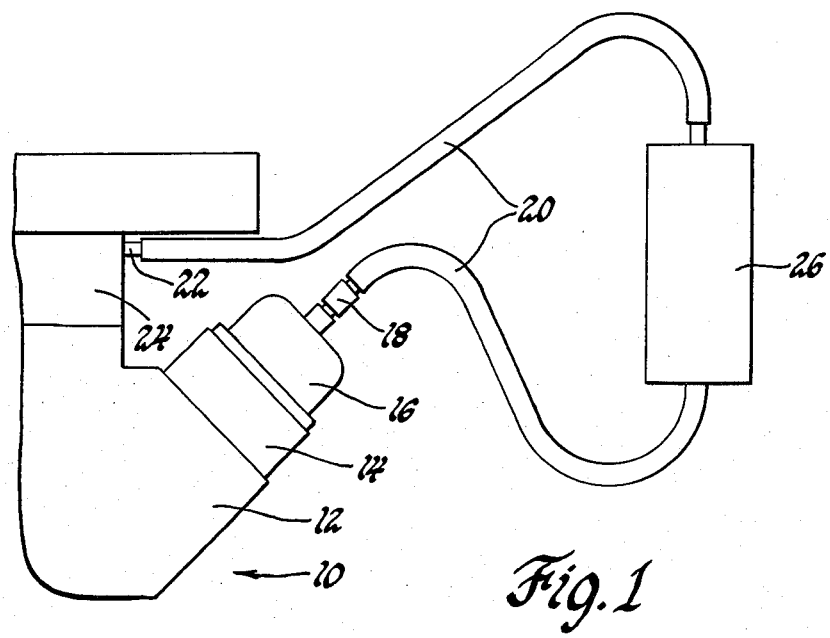

United States Patent [19]

Caracciolo

[11] 4,381,755
[45] May 3, 1983

[54] PROTECTING CATALYST FROM PHOSPHORUS POISONING

[75] Inventor: Frank Caracciolo, Sterling Heights, Mich.

[73] Assignee: General Motors Corporation, Detroit, Mich.

[21] Appl. No.: 176,472

[22] Filed: Aug. 8, 1980

[51] Int. Cl.³ ............................................ F02M 25/06
[52] U.S. Cl. ................................... 123/573; 123/568; 123/572
[58] Field of Search ........... 123/572, 573, 574, 198 A, 123/568; 422/190

[56] References Cited

U.S. PATENT DOCUMENTS

| | | | |
|---|---|---|---|
| 1,975,619 | 10/1934 | Rector | 123/568 |
| 3,025,133 | 3/1962 | Robinson . | |
| 3,246,639 | 4/1966 | Oliver | 123/572 |
| 3,266,474 | 8/1966 | Crandall | 123/572 |
| 3,397,034 | 8/1968 | Tulleners et al. . | |
| 3,476,524 | 11/1969 | Burke | 123/568 |
| 3,540,423 | 11/1970 | Tolles | 123/572 |
| 3,544,264 | 12/1970 | Hardison | 422/190 |
| 3,645,098 | 2/1972 | Templin | 123/568 |
| 3,672,171 | 6/1972 | Eknayan | 123/568 |
| 3,702,110 | 11/1972 | Hoffman | 123/568 |
| 3,828,736 | 8/1974 | Koch | 123/568 |
| 3,846,980 | 11/1974 | DePalma | 123/573 |
| 4,011,846 | 3/1977 | Gagliardi | 123/568 |
| 4,039,471 | 8/1977 | McArthur . | |

Primary Examiner—Ronald H. Lazarus
Attorney, Agent, or Firm—Sidney Carter

[57] ABSTRACT

A method for protecting vehicle emissions control catalyst from phosphorus poisoning comprising contacting at least one of the crankcase ventilation stream and the exhaust gas recirculation stream with a bed of solid adsorbent capable of removing phosphorus compounds in the gas stream, and circulating the treated gas stream to the intake side of the engine.

4 Claims, 2 Drawing Figures

U.S. Patent  May 3, 1983  4,381,755

PROTECTING CATALYST FROM PHOSPHORUS POISONING

In recognition of the desirability of minimizing undesirable products of combustion from vehicle engines, Federal statutes and regulations have imposed ever more stringent limits on the amount of hydrocarbons, carbon monoxide, and nitrogen oxides in vehicle exhaust. At the same time, Federal fuel economy standards require ever increasing fuel economy. Compliance with these requirements imposes an ever increasing problem since solutions in one area often tend to deteriorate performance in the other area, e.g., weight reduction increases fuel economy whereas the addition of control equipment to achieve more complete combustion and otherwise to decrease emissions increases vehicle weight.

One of the more widely used methods for control of emissions is the catalytic treatment of the exhaust gas to oxidize hydrocarbons and carbon monoxide and to minimize nitrogen oxides by reduction. However, as with all catalyst materials, progressive deterioration occurs with use. In the instance of vehicle engine exhaust treatment, the catalytic system must be designed so as to achieve the required low levels of emissions throughout the period for 50,000 miles of vehicle operation, notwithstanding such deterioration.

While catalyst deterioration is recognized as caused by several different mechanisms, e.g., thermal degradation, plugging of the pores of the catalyst support, and poisoning, poisoning of the catalyst is of major concern, especially where noble metals such as platinum, palladium and rhodium, costly and limited availability materials, are used. The prior art has recognized this problem and has proposed various systems for reducing catalyst deterioration by reducing the poison content of the exhaust stream to the catalyst. Typical of such systems is that disclosed by A. J. Robinson et al, U.S. Pat. No. 3,025,133, dated Mar. 13, 1962, covering use of a "lead trap" contact mass through which the exhaust stream is passed prior to contact with the catalyst bed. U.S. Pat. No. 4,039,471 dated Aug. 2, 1977 to McArthur discloses the rejuvenation of poisoned catalyst to extract such poisons as lead, sulfur and phosphorus from the catalyst by contact with ammonium and/or acetate salt solutions. U.S. Pat. No. 3,397,034 dated Aug. 13, 1968 to Tulleners et al discloses an agglomeration, solids separator and acid constituent neutralizer for treatment of the exhaust stream to remove acid constituents and lead prior to contact with the catalyst bed.

It was recognized, e.g., U.S. Pat. No. 3,397,034, that the exhaust stream poisons originated in the fuel and lubricant used in the engine. Since lead has been reduced to trace amounts in the fuel, e.g., 0.003 g/L, phosphorus from the lubricating oil remains as the main poison in the exhaust stream. Based on laboratory and dynamometer testing, I have discovered that significant amounts of phosphorus can be removed from the exhaust stream with a resultant significant increase in the catalyst conversion efficiency so as to enable engine tuning for improved fuel economy while maintaining the required emissions reduction. I have been able to accomplish this reduction in phosphorus in a practical manner by adsorptive treatment not of the exhaust stream of the engine but by only contacting at least one of the crankcase ventilation stream and the exhaust gas recirculation stream with the adsorptive material.

Accordingly, it is an object of my invention to provide a practical method for reducing the phosphorus content in the exhaust from a vehicle engine prior to the treatment of the exhaust with an oxidation and/or reduction catalyst. It is a further object of my invention to pass at least one of the crankcase ventilation stream and the exhaust gas recirculation stream from the engine through a bed of solid adsorbent material to remove phosphorus from said stream, the treated stream being passed to the intake side of the engine for combustion. These and other objects of my invention will be apparent from the description which follows.

Figure 2:
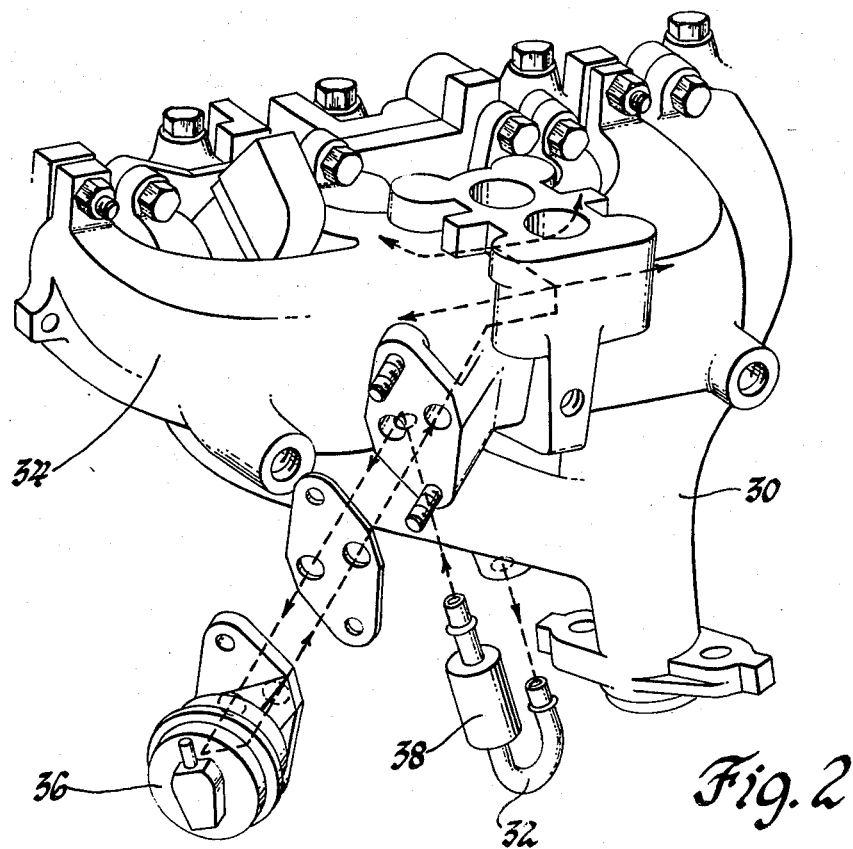

In the drawings:

FIG. 1 illustrates the practice of my method by incorporating a container of solid adsorbent material in the engine positive crankcase ventilation system; and FIG. 2 illustrates the practice of my method by incorporating a container of solid adsorbent material in the engine exhaust gas recirculation stream.

Subsequent to the elimination of lead from engine fuel in 1973–1974, the poisoning effects of specific lubricant additives on catalyst performance were recognized as significant. More particularly, the antiwear additives such as tricresyl phosphate and zinc dialkyldithiophosphate were recognized as phosphorus precursors. As reported by J. A. Spearot and F. Caracciolo, "Engine Oil Phosphorus Effects on Catalytic Converter Performance in Federal Durability and High-Speed Vehicle Tests", SAE Paper #770637, June 1977, vehicle tests using a high-phosphorus oil, 0.17 weight percent, and a low phosphorus oil, 0.08 weight percent, oil usage between vehicles being substantially the same, showed approximately 0.1 g/mi greater hydrocarbon emissions from a vehicle run for 80,000 km under the Federal Durability Driving schedule. This is attributable to greater catalyst poisoning by the 0.17% by weight oil, the difference in hydrocarbon conversion efficiency of the platinum/palladium catalyst being approximately 10%. It has been estimated that the 0.1 g/mi greater hydrocarbon emission is equivalent to a fuel economy penalty of from 5–12%. Similar results have been observed in engine-dynamometer tests using platinum/rhodium catalyst, Frank Caracciolo and James A. Spearot, "Engine Oil Additive Effects on the Deterioration of a Stoichiometric Emissions Control (C-4) System", SAE Paper #790941, October 1979.

In accordance with my invention dynamometer tests were conducted in which a phosphorus adsorber was installed in the positive crankcase ventilation system of a 1977 Oldsmobile 5.7 liter, V-8 engine. A steel cylinder measuring 5 inches in length by 2 inches in diameter and packed with ⅛ inch low-density alumina pellets of the type used as catalyst support, available commercially from suppliers such as Grace Chemical Corporation, was inserted in the crankcase ventilation line downstream of the positive crankcase ventilation (PCV) valve, the treated stream of crankcase vapors being fed into the carburetor. After 24 hours of high-speed and high-load operation, about 75 mph, the adsorbent removed 2.5% of the phosphorus added to the engine from the makeup oil, 0.013 g trapped of 0.54 g added. The trapped phosphorus was 25% of the phosphorus exposed to the adsorbent bed of alumina, 0.039 g being passed through to the carburetor. The total phosphorus passed to the catalytic converter in the engine exhaust was 0.15 g, the remainder, about 0.34 g, accumulating in the engine crankcase. These data are consistent with the vehicle data described above and indicate that the stated increased hydrocarbon conversion and fuel economy are achievable with the method of my invention. It should be noted that instead of having to provide a large adsorbent mass to accommodate the total exhaust flow from the engine as taught by the prior art, with attendant weight, cost, heat-sink and increased back pressure penalties, treatment of the crankcase ventilation stream which constitutes about 1% of the volume of exhaust per unit of time enables substantial reduction of phosphorus poisoning in a practical manner and without the stated penalties.

In FIG. 1 is schematically shown a portion of a V-type, e.g., engine 10 having an engine block 12, cylinder head 14 and rocker arm cover 16. In a conventional crankcase ventilation system, outside air is drawn through the crankcase (not shown) and exhausted from the engine through the rocker cover 16, a control valve 18 and duct 20. In such a conventional system an air stream containing crankcase vapors is drawn through duct 20 to a port 22 in the carburetor 24. The vapors and air are drawn into the cylinders of the engine. This part of the positive crankcase system is conventional and well known. In accordance with this embodiment of my method, I insert into duct 20 a container 26 containing a bed of suitable adsorbent material for adsorbing phosphorus-containing compounds from the stream. Since this air stream is being drawn into the combustion chamber of the engine and the resultant products will ultimately become part of the exhaust stream directed to the vehicle's catalytic converter, phosphorus removal at this stage removes potential catalyst poisons.

While I have referred to a tubular container and alumina adsorbent, any suitably shaped and constructed container may be used to accommodate the adsorbent bed which may be any of the other well known materials for adsorption of phosphorus such as activated charcoal, cordierite and zeolite. The amount of adsorbent used is of course a matter of choice depending on the desired life of the adsorbent trap before change is necessary, adsorbent efficiency, space and pressure drop limitations. Also, a water-trap or condenser may be used for removal of water prior to contact with the adsorbent. While water vapor will not damage the phosphorus trap, it will tend to reduce its adsorption efficiency.

While treatment of the crankcase ventilation stream is preferred as the most effective and practical method for reducing catalyst poisoning by phosphorus, treatment of the exhaust gas recirculation (EGR) stream may be used either in addition to or in lieu of this preferred treatment. The EGR flow rate is about 10% of that of the engine exhaust and thus the phosphorus trap used will be exposed to a larger amount of gas and phosphorus, this requiring adjustments in the size of the trap and weight of adsorbent. As in the case of treatment of the crankcase ventilation stream, the phosphorus trap is inserted in the EGR line prior to and feeding into the intake side of the engine, e.g., the carburetor.

FIG. 2 schematically depicts a portion of a conventional exhaust gas recirculation system of an automobile 4-cylinder, e.g., engine. A portion only of the exhaust stream is diverted from exhaust duct 30 through a suitable tube 32 into the inlet manifold 34 of the engine. The flow of this exhaust gas recirculation stream is controlled by exhaust gas recirculation valve 36 as is known. The relationship between the valve 36, tube 32 and intake manifold 34 is shown in an exploded view to better depict the flow of the recirculated portion of the exhaust stream. In accordance with this embodiment of the practice of my method, I insert in tube 32 a container 38 of adsorbent material for trapping phosphorus-containing materials from the recirculated exhaust stream. Of course, the main portion of the engine exhaust gas goes to the catalytic converter (not shown) and does not pass through the phosphorus trap 38.

From the foregoing description it is apparent that a practical and simple method has been provided for protecting vehicle emissions catalyst materials from phosphorus poisoning with resultant improved life and conversion efficiency of the catalyst, this permitting the initial tuning of the engine for improved fuel economy. Modifications of my invention as may be obvious to those skilled in the art are within the scope of my invention as contemplated by the claims which follow.

The embodiments of the invention in which an exclusive property or privilege is claimed are defined as follows:

1. A method of protecting the catalyst materials in a catalytic converter vehicle emissions control system from the poisoning effect of phosphorus, said converter being located in the exhaust path of an internal combustion engine, comprising contacting at least one engine gas stream selected from the crankcase ventilation stream and the exhaust gas recirculation stream with a bed of solid adsorbent capable of removing phosphorus and phosphorus compounds in said gas stream, and circulating said treated gas stream to the intake side of the engine, the phosphorus content of said exhaust stream being reduced by absorption from that present in the absence of said solid adsorbent treatment said bed being heated principally only by the stream being treated.

2. A method as set forth in claim 1 wherein said engine gas stream is the crankcase ventilation stream.

3. A method as set forth in claim 2 wherein said solid adsorbent is selected from the group consisting of alumina, activated charcoal, cordierite and zeolite.

4. A method as set forth in claim 3 wherein said adsorbent is alumina.

* * * * *